Sept. 18, 1962  R. S. HARTLEY ETAL  3,054,431
FOOD PROCESSING MACHINERY

Filed Oct. 2, 1959  2 Sheets-Sheet 1

INVENTORS
RICHARD S. HARTLEY &
HAROLD D. HANNAH
BY
Marechal, Biebel, French & Bugg
ATTORNEYS Sept. 18, 1962  R. S. HARTLEY ETAL  3,054,431
FOOD PROCESSING MACHINERY
Filed Oct. 2, 1959  2 Sheets-Sheet 2
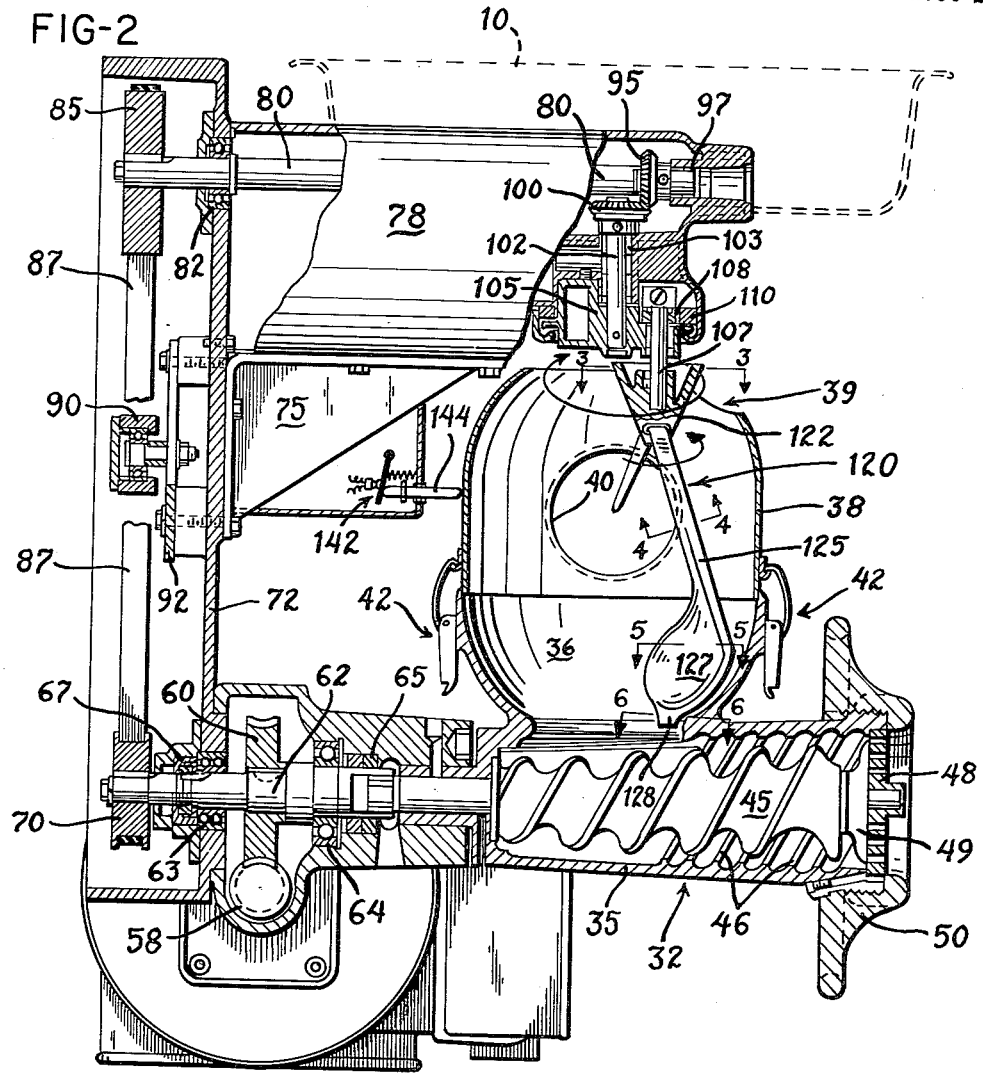
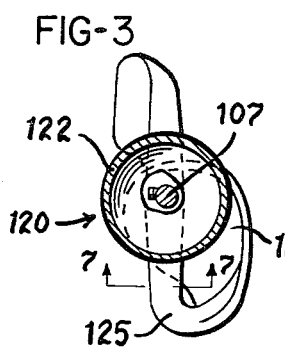
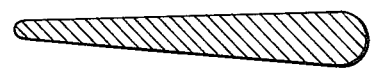
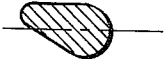
INVENTORS
RICHARD S. HARTLEY &
HAROLD D. HANNAH
BY
Marechal, Biebel, French & Bugg
ATTORNEYS United States Patent Office 3,054,431
Patented Sept. 18, 1962

3,054,431
FOOD PROCESSING MACHINERY
Richard S. Hartley and Harold D. Hannah, Troy, Ohio, assignors to The Hobart Manufacturing Company, Troy, Ohio, a corporation of Ohio
Filed Oct. 2, 1959, Ser. No. 844,028
7 Claims. (Cl. 146—78)

This invention relates to apparatus for chopping and mixing food products, particularly to the preparation of ground meat.

In the chopping of food products, particularly in preparing ground meat products, it is customary to subject the material to at least two chopping operations to assure a thoroughly chopped end product and to mix the material thoroughly, for example to mix the fat into the lean parts of meat so that the end product is properly mixed with the right proportion of fat to lean for good flavor.

Merely passing the ground meat twice through a chopping machine does not necessarily produce the desired result, and therefore it is desirable to mix the product between chopping operations. It is important to control the intermediate mixing or blending operation such that the proper amount of mixing or blending is accomplished without overmixing. Otherwise the product, and the fat particularly, may become mashed, resulting in an undesirable end product. On the other hand, the mixing must be sufficient to blend the fat and lean parts of the meat thoroughly, or the end product will have portions of predominantly fat and predominantly lean, which is also an undesirable end product.

Also, where substantial quantities of meat or the like are being chopped, the two-stage chopping operation requires considerable handling of the material which might be effectively reduced if the two chopping operations could be combined. However, it has been found that merely prolonging the chopping operation, or directing the output of one chopper into the input of a second, does not produce the desired results since the mixing of the once chopped material may not be proper, as mentioned above, and the chopped meat will not feed properly under gravity into the inlet of a second chopper worm. Therefore, it is desirable to mix the material positively, after it is discharged from the first chopping operation, and then feed the material with an effective feeding force into the inlet of the second chopper worm, without requiring any manual operations or handling between the two chopping operations.

Therefore, the primary object of this invention is to provide improved food chopping apparatus wherein the food products are chopped once and then effectively mixed, and the mixed product is packed into the inlet of a second chopping machine to produce a thoroughly chopped and effectively mixed end product.

Another object of the invention is to provide such food chopping apparatus wherein the entire apparatus operates as a unit and is arranged to occupy minimum amount of space.

Another object of the invention is to provide such food chopping apparatus wherein the second chopping machine and the mixing apparatus are driven from the same source to coordinate the mixing and feeding operation to the input of the second chopping machine.

An additional object of the invention is to provide such chopping apparatus wherein the common drive for the second chopping machine and the mixing apparatus may be controlled independently of the drive to the first chopping machine, thereby providing a control over the rate of operation which enables the operator to form and maintain a dominant batch of once chopped material in the mixing bowl without overloading the mixing apparatus to the extent that the material therein is worked excessively by the mixing apparatus.

A further object of the invention is to provide food chopping apparatus including a chopper barrel having an inlet which is provided with a mixing bowl, and within which a combined packer and mixing member is rotated about the vertical axis of the bowl and includes a paddle which effectively forces chopped material into the barrel inlet.

Another object of the invention is to provide such food chopping apparatus wherein the packer member is so driven that its axis of rotation orbits about the vertical axis of the barrel inlet while the packer is continually rotated.

An additional object of the invention is to provide such chopping apparatus wherein the packer and mixing member consists of an arm which passes in close proximity to the walls of the bowl during each revolution thereof to move material adjacent the walls toward the center of the bowl to be acted upon by the paddle and forced toward the chopper worm.

Other objects and advantages of this invention will be apparent from the following description, the accompanying drawings and the appended claims.

In the drawings—

FIG. 2 is a view taken on line 2—2 of FIG. 1, with portions of the mixer drive housing remaining in elevation;

FIG. 3 is a top view on an enlarged scale of the packer and mixing member shown in FIGS. 1 and 2;

FIG. 4 is an enlarged section taken on line 4—4 of FIG. 2;

FIG. 5 is another enlarged sectional view taken on line 5—5 of FIG. 2;

FIG. 6 is a further enlarged section taken on line 6—6 of FIG. 2; and

FIG. 7 is a section on line 7—7 of FIG. 3.

Figure 1:
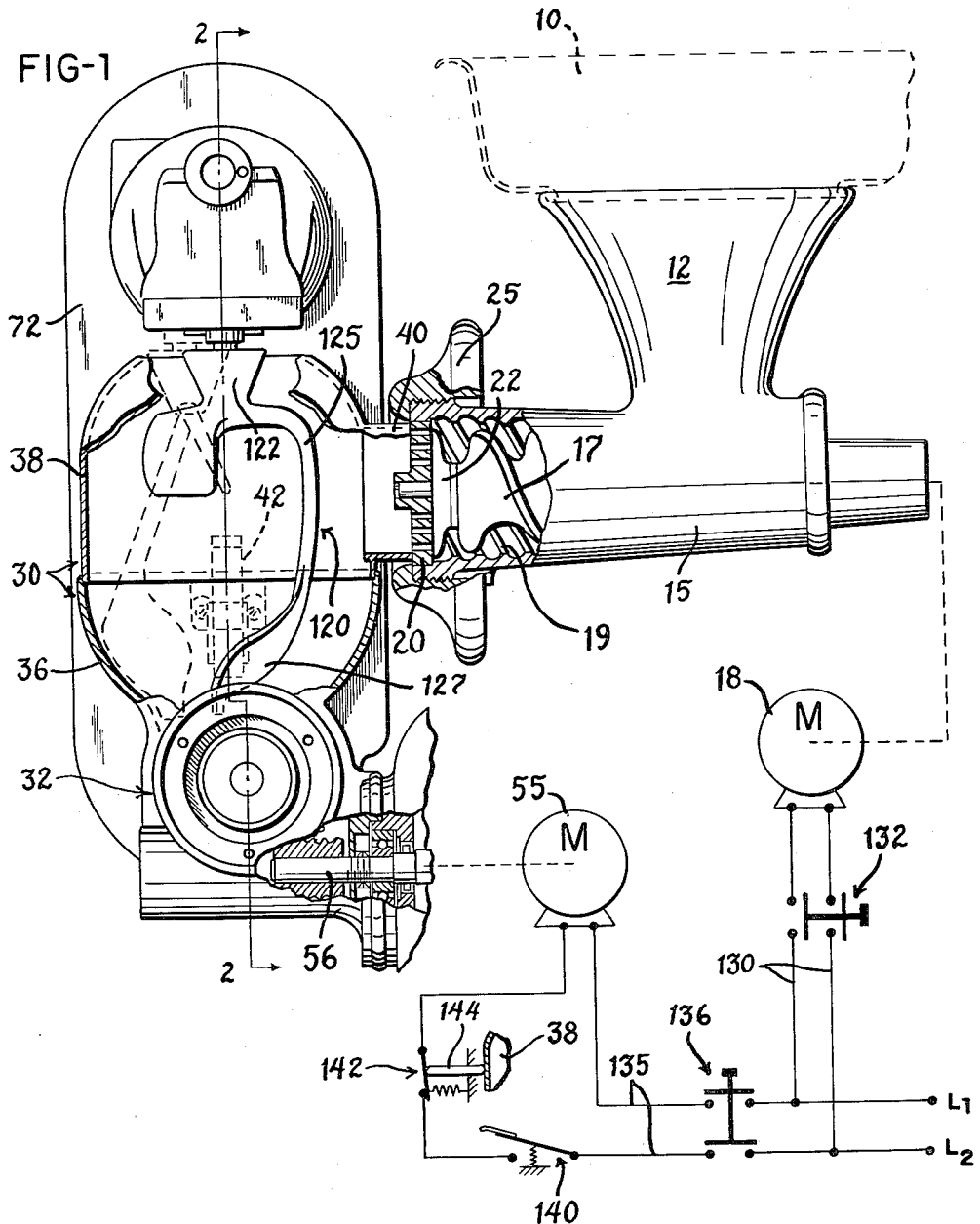
FIG. 1 is a front view, partially in elevation and partially broken out in section, showing the overall arrangement of food chopping apparatus in accordance with the invention.

Referring to FIG. 1, the inlet to the apparatus is provided by a pan 10 shown in dotted lines, which is mounted upon the inlet hopper 12 of a first chopping machine having an elongated barrel 15 within which worm 17 is rotated by a suitable drive motor indicated schematically at 18. The worm receives chunks of food material, for example meat, which are fed through the hopper 12 toward the outlet of barrel 15, and at the same time, by reason of coaction between the worm and flutes 19 formed in the walls of the barrel interior, cuts the chunks into smaller pieces and forces them toward a conventional die 20 at the end of the barrel, and a rotating knife 22 which cooperates with the die to chop the material, after which the material is extruded through the die and past the retainer ring 25 which forms the outlet of the first chopping machine.

The chopped material passing from the discharge of the first chopping machine enters a mixing bowl 30 within which it is thoroughly mixed and then fed to the inlet of a second chopping machine indicated by the general reference numeral 32, the bowl, together with its connections, forming conduit means through which chopped material passes from the first to the second chopping machine. The second chopping machine includes a barrel 35 having an inlet which carries an integral upwardly opening bowl-shaped member 36 forming the lower portion of the mixing bowl 30. The upper portion of the bowl is provided by a generally cylindrical member 38, the top of which is formed inwardly as a portion of a hemisphere, and which includes a top opening 39 cut away at the front. The inlet to the mixing bowl is provided by a short cylindrical inlet piece 40 which projects from the side of the bowl member 38 and fits snugly against the exterior face of die 20 on the first chopping machine. The two parts of the mixing bowl 30 are retained normally in stacked relation by the overcenter latches 42 (FIG. 2) which may be released to free the upper bowl portion 38 when access is required to the inlet of the second chopping machine. The bottom of the bowl member 36 has an outlet opening in its base which is of substantially less cross-section than the transverse cross-section of the bowl, and which leads directly into the second chopping machine.

The second chopper includes the usual chopper worm 45 which cooperates with the helically formed flutes 46 on the interior of barrel 35 to cut the material therebetween and at the same time to feed the material forwardly toward the discharge, where a die 48 and a knife 49, rotating with worm 45, act to perform the second chopping operation, after which the thoroughly mixed and chopped material is extruded through the die and discharged over the lip of the retainer ring 50.

The rotating parts of the second chopping machine and the mixer are driven from a common source, serving to coordinate them and to simplify their motor drive. The drive is shown as an electrical motor 55 having an output shaft 56 which carries a drive worm 58 meshing with the worm gear 60 which is in turn keyed to drive shaft 62 for the chopper worm 45 and knife 49. This shaft is mounted in ball bearings 63 and 64, respectively, and suitable rotary seals 65 are provided between the forward bearing 64 and the drive connection between shaft 62 and worm 45. The shaft extends at its rearward end through rear bearing 63, through a seal 67, and carries a drive pulley 70 keyed thereto for rotation with the shaft.

The pulley is mounted within a vertically extending housing 72 which is suitably fastened to the rear of the drive housing for the worm drive, and which supports a bracket 75 carrying an upper housing 78 which projects above the second chopping machine and over the mixing bowl 30. Within housing 78 there is a counter shaft 80, supported at its rearward end by a ball bearing 82 carried in the upper end of housing 72, and carrying the driven pulley 85 upon its rearward end, which extends into housing 72. A belt 87 provides the drive connection between pulleys 70 and 85, and an idler pulley 90, adjustably supported within a bracket 92, is positioned to engage belt 87 and provide proper tensioning thereof.

Counter shaft 80 has a bevel gear 95 fastened to its forward end, and the forward end of the shaft in turn is mounted within a bearing 97. Bevel gear 95 meshes with a driven bevel gear 100 which is carried on the upper end of a mixer drive shaft 102 supported for rotation about a vertical axis by a thrust bearing 103. The lower end of shaft 102 is fastened to a carrier 105 which in turn supports a shaft 107 having a planet gear 108 secured to the upper end thereof and in mesh with the internal gear 110 which is secured within the housing 78. Thus, rotation of shaft 102 produces rotation of the planet carrier which in turn causes the shaft 107 to revolve about its own axis and also to orbit about the axis of shaft 102.

Shaft 107 carries a mixing and packer member 120 which includes a hub 122 fastened securely to the lower end of shaft 107. From this hub an arm 125 extends laterally and then downwardly at an angle with respect to the hub, terminating in a paddle 127 which projects in the opposite direction from the downwardly extending portion of arm 125, and terminates in a packing finger 128 which extends into the inlet opening for the barrel 35 of the second chopping machine. The arm 125 is of generally teardrop shape in cross-section, as shown in FIGS. 4 and 7 and the paddle 127 has a cross-section of elongated foil-like shape as shown in FIG. 5.

In operation, the shaft 102 is driven in a counterclockwise direction, as viewed from the bottom of FIG. 2, and this causes shaft 107 to rotate in a clockwise direction, viewed the same, while orbiting in the counterclockwise direction. Thus, paddle 127 is rotated in a direction to move the once ground material in bowl 30 downwardly toward the inlet opening of barrel 35, and therefore to pack the ground material upon the worm 45 to assure proper feeding in the second chopping machine. At the same time, the arm 125 moves through the material to mix it thoroughly and at the same time, once during each revolution, to pass adjacent the walls of the mixing bowl, providing a scraper means which carries any material tending to stick adjacent the bowl walls toward the center of bowl for feeding downwardly by the paddle. Also, each time the arm 125 passes the inlet cylinder 40 it will serve to break up the mass of once chopped material issuing therefrom and to mix this material with the rest already in the bowl.

The power supply and controls for the apparatus are shown schematically in connection with FIG. 1, where the electrical supply lines are designated L1 and L2. From these lines the power for motor 18 is supplied through the lines 130 whenever the manually operated switch 132 is closed. Since the operator is feeding chunks of material into the first chopping machine manually, from the pan 10, the effective output of the first chopper will depend upon its capacity and the rate at which the operator supplies pieces of meat or other material to be chopped into the hopper 12.

The power to the motor 55 driving the second chopping machine and the mixer is supplied through the lines 135 whenever manual switch 136 is closed in conjunction with the series connected switches 140 and 142. Switch 140 is normally biased open and may be closed under control of the operator, for example by movement of a suitable conventional foot pedal control or the like which may close this switch when depressed. Switch 142 is a safety switch, preferably a conventional microswitch, which is controlled by a plunger 144 (FIG. 2), and normally biased open. When the mixing bowl top 38 is properly in position, it engages the plunger 144 and moves it against the bias on switch 142 to close this switch and complete the circuit. Therefore, whenever the mixing apparatus is so disassembled that an operator's hands might be placed in dangerous proximity to the mixing mechanism or to the worm of the second chopping apparatus, the power supply to motor 55 is interrupted.

As mentioned at the outset of this specification, it is desirable to provide a proper amount of mixing between the two chopping operations. Too little mixing or blending will result in an improperly blended end product, and on the other hand excessive mixing will result in mashing of ground meat products, particularly, with the resultant end product being commercially unacceptable. Therefore, the capacity of the second chopping machine 32 is essentially the same as, or slightly less than, the capacity of the first chopping machine. It should be recalled that due to the manual feeding of chunks of material into barrel 12, the operator is always able to retard the effective output of the first chopping machine without interruption of the drive therefor.

The capacity of the mixer bowl is such that when this bowl, and particularly the lower portion 36 thereof, contains a dominant batch of once chopped product from the first chopping machine, the feeding action of the mixer together with the correlated capacity of the second chopping machine will produce the proper mixing time and discharge the mixed product into the second chopping machine 32. In practice, using dies of approximately four inch diameter in each of the first and second chopping machines, and with the maximum horizontal diameter of the mixer bowl approximately eight inches, a dominant batch of approximately five pounds of once-chopped meat product, particularly in the case of ground beef, has proved to give suitable results.

In operation, the dominant batch is obtained, and maintained, within the mixing bowl by permitting the first chopping machine to operate and discharge into the mixing bowl until the proper quantity has accumulated therein. Then, the operator may close the pedal switch 140 and initiate the operation of the mixer and second chopping machine, with the capacities thereof being sufficient to maintain the dominant batch within the mixer bowl while still providing an effective feed into and through the second chopping machine 32. With continued proper feed of chunks of material into the hopper 12, these conditions will be maintained, but if for some reason the operator finds it necessary to hold back on manual feeding from the pan 10, he may also stop the mixer and second chopping machine for whatever period necessary to maintain the proper dominant batch within the mixer bowl, by releasing the pedal operated switch 140.

Another advantage of proper mixing and blending in the above described fashion is obtained from the ability to add seasoning, particularly to ground meat products, either with the chunks of meat supplied to the barrel 12 of the first chopping machine, or into the mixing bowl 36. The mixing or blending action intermediate the two chopping operations serves to distribute the seasoning thoroughly and blend it properly into the ground meat products.

As is apparent from the foregoing description, the present invention provides novel apparatus for chopping and mixing food products, such as meat, whereby the food is twice chopped and subjected to a thorough mixing between the separate chopping actions. The entire operation is continuous and requires no attention from an operator other than feeding the products to be chopped into the apparatus and removing the chopped and mixed end product for packaging. Thus, the apparatus reduces considerably the labor required to prepare products such as chopped meat, and also provides a more thorough mixing of the chopped end product than is normally obtained by feeding the material twice manually through an ordinary chopping machine.

While the form of apparatus herein described constitutes a preferred embodiment of the invention, it is to be understood that this invention is not limited to this precise form of apparatus and that changes may be made therein without departing from the scope of the invention which is defined in the appended claims.

What is claimed is:

1. Food chopping apparatus comprising the combination of a first chopping machine adapted to subject food materials to a chopping action, a discharge on said first chopping machine, an open top bowl having a connection with said discharge to receive chopped material freely discharged therefrom, said bowl having an outlet opening at the base thereof, a second chopping machine having its inlet connected directly to said bowl outlet, separate drive means connected to operate each of said chopping machines independently of the other, a mixer supported to rotate within said bowl and including a paddle arranged to force chopped material downwardly through said bowl outlet opening, and means connected to drive said mixer from the drive means of said second chopping machine concurrently with said second chopping machine.

2. Food chopping apparatus comprising the combination of a first chopping machine adapted to receive raw food material and to subject said material to a chopping action under mechanical pressure, a discharge on said first chopping machine, a bowl supported beneath said discharge to receive chopped material freely discharged therefrom, said bowl having an outlet opening at the base thereof of substantially less cross section than the top of said bowl, a second chopping machine having its inlet connected directly to said bowl outlet, a mixing and packer member including a paddle on the lower end thereof extending vertically into said bowl, means supporting said member with said paddle extending at an angle with respect to the vertical axis of said bowl, selectively controlled second drive means connected to operate said second chopping machine and simultaneously to rotate said member in a direction causing said paddle to force chopped material downward of said bowl through said outlet opening, said second drive means including an orbiting member connected to move the axis of rotation of said mixing and packer member about said vertical axis of said bowl providing for mixing and feeding of material in the said second chopping machine, and an independently controlled first drive means for said first chopping machine maintaining a dominant batch of once chopped material in said bowl.

3. A food chopping machine comprising a first chopper including an elongated barrel having an inlet and a discharge end, a cutter and die unit at the discharge end of said barrel, means in said barrel operative to force material through said cutter and die unit for chopping thereof, a first selectively operable drive means for said first chopper, a receiving bowl adjacent said discharge end of said barrel for accepting chopped material discharged from said first chopper, said bowl having an outlet opening in the bottom thereof, a second chopper including an elongated barrel having an inlet and a discharge end, a cutter and die unit at said discharge end of said second chopper, means connecting said inlet of said second chopper with said bowl outlet opening, a packer member extending into said bowl to adjacent said outlet opening and projecting at an angle thereto, means for rotating said packer member in a direction to force chopped material through said outlet opening into said second chopper for a further chopping of the material, and a second drive means operable independently of said first drive means and connected to drive said second chopper and said means for rotating said packer member simultaneously to mix material in said bowl and feed the chopped material into and through said second chopper.

4. Food chopping apparatus comprising the combination of a first chopping machine adapted to receive raw food material and to subject said material to a chopping action under mechanical pressure, first drive means operative to drive said first chopping machine, a discharge on said first chopping machine from which chopped material is passed during operation thereof, a bowl supported beneath said discharge to receive chopped material discharged therefrom, said bowl having an outlet opening at the base thereof, a second chopping machine having its inlet connected directly to said bowl outlet, a packer member extending vertically into said bowl and including thereon means for mixing the chopped material in said bowl, second drive means connected to operate said packer member and said second chopping machine simultaneously and in correlated relation, and control means for said second drive means providing for selective operation thereof independently of the operation of said first drive means for forming and maintaining within said bowl a dominant batch of chopped material.

5. Food chopping apparatus for use with a first power driven chopping machine having a discharge from which chopped food material is passed during operation thereof, comprising in combination a bowl supported for positioning beneath the discharge to receive chopped material discharged therefrom and including an outlet opening at the base of said bowl, a second chopping machine having its inlet connected directly to said bowl outlet, a packer member extending vertically into said bowl and including thereon means for mixing the chopped material in said bowl, separate second power drive means connected to operate said packer member and said second chopping machine in correlated relation, and control means for said second drive means providing for selective operation thereof independently of the first chopping machine to form and maintain within said bowl a dominant batch of chopped material which is mixed in correlated relation to feeding thereof through said second chopping machine.

6. Food chopping apparatus as defined in claim 2, including scraper means on said mixing and packer member extending normally into close proximity to the walls of said bowl for mixing material in said bowl and moving material adjacent said walls toward the center of said bowl to be acted upon by said paddle.

7. A food chopping device for meat and the like comprising a first chopping means having a discharge conduit and a first driving means, a second food chopping device having an inlet conduit, a mixing bowl interconnecting said discharge conduit and said inlet conduit, a mixing means in said bowl, a second driving means connected to said second food chopping device and to said mixing means, and a separate control means for each of said first and second driving means.

References Cited in the file of this patent
UNITED STATES PATENTS

| | | |
|---|---|---|
| 1,032,258 | Wefing | July 9, 1912 |
| 1,764,404 | Hileman | June 17, 1930 |
| 2,633,170 | Blamain | Mar. 31, 1953 |
| 2,863,480 | Combs | Dec. 9, 1958 |